United States Patent [19]

Tiernan

[11] Patent Number: 5,004,531
[45] Date of Patent: Apr. 2, 1991

[54] TREATMENT OF CONCENTRATED INDUSTRIAL WASTEWATERS ORIGINATING FROM OIL SHALE AND THE LIKE BY ELECTROLYSIS POLYURETHANE FOAM INTERACTION

[76] Inventor: Joan E. Tiernan, 38 Clay Ct., Novato, Calif. 94947

[21] Appl. No.: 318,571

[22] Filed: Mar. 3, 1989

Related U.S. Application Data

[62] Division of Ser. No. 148,721, Jan. 26, 1988, Pat. No. 4,929,359.

[51] Int. Cl.$^5$ ............................................. C02F 1/461
[52] U.S. Cl. .................................... 204/307; 204/273; 210/243; 210/263
[58] Field of Search ............... 204/149, 152, 302, 307, 204/273; 210/243, 263, 266, 280

[56] References Cited

U.S. PATENT DOCUMENTS

| 4,302,310 | 11/1981 | Watson et al. | 204/302 |
| 4,328,105 | 5/1982 | Arbuckle | 210/796 |

OTHER PUBLICATIONS

Wen, C. S. et al., "Purification and Recovery of Economic Materials from Oil Shale Retort Water by an Electrolytic Treatment Process" In *The Second Pacific Chemical Engineering Congress*, Amer. Inst. of Chem. Eng., N.Y.; N.Y., 1977.
Braun, T. et al., "Polyurethane Foams and Microspheres in Analytical Chemistry" *Analytica Chimica Acta*, 99, 1–36, 1978, Amsterdam, The Netherlands.
Romagnoli, R. J. et al. "Polyurethane Foam Filtration" *Proceedings of the 33rd Industrial Waste Conference*, Purdue University, 343, Ann Arbor Science Publishers, Inc., Ann Arbor, Mich., 1979.
Canadian Plant and Processing Engineering, Ltd., *Polyurethane as an Oil Filter, Final Report*, Halifax, Nova Scotia, Conducted for the Canadian Dept. of Fisheries and Forestry, Burlington, Ontario, Dec. 1972.
Poon, C. P. C. et al., "On-Site Generation of Chemicals for Sewage Treatment" *Water and Sewage Works*, 60, Dec. 1974.
Biwyk, A., "Electrocoagulation of Biologically Treated Sewage" *Proceedings of the 28th Industrial Waste Conference*, Purdue University, 541, Ann Arbor Science Publishers, Ann Arbor, Mich., 1973.
Clark, J. W. *Water Supply and Pollution Control*, Harper and Row Publishers, San Francisco, 1977, pp. 410–411.
Blanc, F. C. et al. "Electrolytic Control of Anaerobic Waste Treatment Processess" *Proceedings of the 28th Industrial Waste Conference*, Purdue Unversity, 349, Ann Arbor Science Publishers, Ann Arbor, Mi, 1973.
Poon, C. P. C. "Electrochemical Process for Sewage Treatment" in *Proceedings of the 28th Industrial Waste Conference, Part One*, Ann Arbor Science Publishers, Inc., Ann Arbor, Mich., 1973.
Lewis, R. G. et al., "Portable Sampler for Pesticides and Semivolatile Industrial Organic Chemicals in Air", *Anal. Chem.*, 54, 310, 1982.
Kramer, G. R. et al. "Electrolytic Treatment of Oily Wastewater" *Proceedings of the 34th Industrial Waste Conference*, Purdue University, 673, Ann Arbor Science Publishers, Inc. Ann Arbor, MI, 1979.
Kuhn, A. T. "Electrochemical Techniques for Effluent
(List continued on next page.)

Primary Examiner—Ivars Cintins
Attorney, Agent, or Firm—Antonio M. Fernandez

[57] ABSTRACT

Highly concentrated and toxic petroleum-based and synthetic fuels wastewaters such as oil shale retort water are treated in a unit treatment process by electrolysis in a reactor containing oleophilic, ionized, open-celled polyurethane foams and subjected to mixing and laminar flow conditions at an average detention time of six hours. Both the polyurethane foams and the foam regenerate solution are re-used. The treatment is a cost-effective process for wastewaters which are not treatable, or are not cost-effectively treatable, by conventional process series.

7 Claims, 4 Drawing Sheets

OTHER PUBLICATIONS

Treatment" *Chemistry and Industry,* 946, Aug. 21, 1971.

Roberts, P. et al., *Industrial Applications of Electroorganic Synthesis* Ann Arbor Science Publishers, Ann Arbor, MI, 1982, pp. 6–17, 78–99 & 174–195.

Miller, H. C. et al. "Electrochemical Treatment of Municipal Wastewater" Environmental Health Series, AWTR-13, Mar. 1975.

Potter, E. C., *Electrochemsitry Principals and Applications,* Cleaver Hume Press Ltd., London, England, 1956, pp. 1–7, 14, 129–135 & 346–349.

Shaffer, G. H. et al. "Electrodialysis", in *Principles of Desalination,* K. S. Spiegler (Ed) Academic Press, New York, 1966, pp. 200–206 & 245–255.

Tiernan, J. E., "Treatment of Oil Shade Retort Water by Electrolyis in Oleophilic Polyurethane Foam" Doctoral Dissertation, Dept. of Civil Engineering, University of California at Berkeley, 1987.

Chemical Abstracts, vol. 89, 1978, No. 168557y.

Chemical Abstracts, vol. 90, 1979, No. 106678a.

Chemical Abstracts, vol. 90, 1979, No. 11873w.

Chemical Abstracts, vol. 91, 1979, No. 80979m.

TREATMENT OF CONCENTRATED INDUSTRIAL WASTEWATERS ORIGINATING FROM OIL SHALE AND THE LIKE BY ELECTROLYSIS POLYURETHANE FOAM INTERACTION

BACKGROUND OF THE INVENTION

The invention described herein arose in the course of, or under, Contract No. DE-AC03-76SF00098 between the U.S. Department of Energy and the University of California.

This is a Division of application Ser. No. 748,721 filed Jan. 26, 1988, now U.S. Pat. No. 4,929,359.

This invention relates generally to the decontamination of industrial wastewaters, and particularly to the treatment of oil refinery wastewaters and concentrated, oily, industrial wastewaters not amenable to conventional secondary treatment due to the presence of refractory or toxic organic, metallic, and organometallic chemical compounds.

The processing of oil-shale and similar substances creates the need either to treat and dispose of wastewaters contaminated during the on-site processing or to treat these wastewaters for reuse. However, before such wastewaters can be effectively disposed or reused, certain environmental problems, such as possible water pollution and air pollution, toxicity, nonbiodegradeability, biofouling, scaling, and corrosion need to be solved. Numerous approaches have been proposed to meet these demands, including steam stripping, oil and grease removal, adsorption, biological oxidation, reverse osmosis, chemical oxidation, flocculation and sedimentation, filtration, activated sludge treatment, final clarification, and ammonia steam stripping. To date, no cost effective treatment has been found for oil shale retort water and certain petroleum wastewaters which are both highly concentrated and highly toxic.

Open-celled polyurethane foam filters are just beginning to be commercialized in the United States for water and wastewater treatment, although they have been utilized for air pollution control for some years. A polyurethane foam filtration system using a cationic polymer additive has been investigated in pilot plants by Union Carbide Corporation.

The Toyo Rubber Industry Company, Ltd. of Japan manufactures polyurethane foams suitable for filtration processes. Japanese Patent No. 7842,450, issued Apr. 17, 1978, to S. Fukushima, S. Yoshimura, T. Nagai, H. Nodo, and K. Fujita, discloses a method of manufacturing a polyurethane foam for use in a filtration process, while Japanese Patent No. 7898,155, issued Aug. 28, 1978, to S. Yoshimura, S. Fukushima, T. Nagai and K. Fujita, discloses a wastewater treatment process employing a polyurethane foam filter. The treatment process described in the latter uses $CaCl_2$ treatment, skimming, and filtering through a packed tower containing sand, anthracite, or glass beads. The wastewater is then passed through a stationary, ionized, polyurethane-filled tower as a subsequent step.

U.S. Pat. No. 3,617,551, issued Nov. 2, 1971, to W. F. Johnston, discloses an apparatus useful for purifying oil contaminated water in which the water to be treated is passed through a chamber containing polyurethane foam for absorbing the oil. Periodically, the filter material is compressed so as to squeeze the absorbed oil from it.

U.S. Pat. No. 4,279,757, issued July 21, 1981, to G. Debeuckelaer, et al., discloses a process for separating hydrophobic organic liquids from water which comprises passing a mixture of water and organic liquids through a column-like vessel which is filled with polyurethane foams having densities of 15 to 200 grams per liter, and preferrably in the range of 30 to 60 grams per liter.

U.S. Pat. No. 4,212,733, issued July 15, 1980, to Y. Goto, et al., discloses an oil-water separation filter employing sintered polyethylene powder bonded to a fibrous layer, while U.S. Pat. No. 4,237,237, issued Dec. 2, 1980, to W. Jarre et al, discloses the manufacture and use of hydrophobic polyurethane foams. U.S. Pat. No. 4,430,230, issued Feb. 7, 1984, to T. Satake, discloses a method for removal of impurities from liquid mixtures by kneading the impurities-containing liquid mixture with a viscoelastic material having an affinity with the impurities and having substantially no affinity for the liquid medium.

U.S. Pat. No. 4,238,326, issued Dec. 9, 1980, to B. A. Wolf, discloses a fluid processor apparatus and method, and more particularly a petrochemical fluid processing apparatus and method for removing elements such as water or moisture from a stream of fluid (liquid or gas) wherein an electric potential is applied to at least an anode electrode plate and a permanently magnetized cathode electrode plate. A reactor containing a polypropylene mesh material for contacting the fluid is used. The polypropylene mesh material has a hemispherical configuration conforming to the concave bottom of the shell, and an integrally formed center channel extending upward into the middle chamber, and is designed to coalesce water and moisture.

SUMMARY OF THE INVENTION

The object of the present invention is to provide a system for treating highly concentrated and toxic oil contaminated industrial wastewater which is more cost-effective than processes currently employed.

The subject invention is a unit wastewater treatment process which emphasizes reuse of all process materials while producing a high quality effluent at a low cost. The invention is comprised of four main equipment items:
1. a process reactor in which wastewater treatment takes place,
2. a low temperature distiller to clean the contaminated organic solvent which regenerates the treatment materials (i.e., the polyurethane foams),
3. a waste solvent holding tank, and
4. a clean solvent feed tank.

The major process materials utilized are:
1. ionized open-celled polyurethane foam which completely fills the treatment reactor at a concentration of 40 grams per liter, but at approximately 80% void volume allows space for wastewater to be added,
2. an aluminum screen or metal net surrounding the inside of the reactor to which electrodes are attached and a low level electrical current is applied, and
3. an organic solvent such as acetone which is used to clean and regenerate the contaminated polyurethane foams.

FIG. 1 illustrates the process flow schematic. During treatment operation, the oily wastewater is pumped into the treatment reactor which is filled with the sponge-like ionized polyurethane foams. A low level electrical current is applied to the reactor screen or net and the wastewater is treated for a period of six hours or more, depending on the mode of operation and the level of treatment desired. After treatment, the treated effluent is discharged. The polyurethane foams in the reactor are now highly contaminated with oils, suspended solids and other contaminants. Acetone, or other organic solvent, is then pumped into the reactor from the acetone feed tank. The acetone quickly elutes the oily contaminants from the foams in about 15 minutes. The contaminated acetone is then discharged to the waste acetone holding tank. After the acetone is drained from the treatment reactor, ambient or warm air is then pumped through the reactor to evaporate any acetone remaining on the foams. The evaporated acetone is condensed and returned to the acetone feed tank. Complete foam regeneration takes about one hour. Then the treatment reactor is again ready to be filled with wastewater and the cycle is repeated. In the meantime, the contaminated acetone in the waste acetone holding tank is pumped to the low temperature distiller where the contaminated acetone is heated at 120°–133° F., distilled off, condensed, and piped to the acetone feed tank for reuse.

This closed cycle process produces no waste except a heavy oily bottoms which results from the contaminated acetone distillation. These oily bottoms may be reclaimable with further refining. No water, except the wastewater to be treated, is used in the process.

Acetone reuse is unlimited except for leakage losses which might occur in the piping or processes. The number of foam reuses will vary with mode of operation of the treatment reactor. After the polyurethane foams are spent, they can be disposed or they can be chemically broken down under specified temperature and chemical conditions into their original chemical constituents, and then utilized to produce new polyurethane foams. Polyurethane foam manufacture and degradation is not part of this invention.

At least three modes of operation for the invention exist:

1. An electrolized continuously stirred batch reactor (CSBR).
2. A continuous flow electrolized tower or recirculating tower.
3. A continuous flow or recirculating electrolized filter.

All modes of operation, and subsequent reactor designs have the following elements in common. The reactor consists of a housing (i.e., a tank, tower, or filter); a metal screen inside the reactor which conducts and distributes the electrical current around the reactor; an inner, perforated smooth wall placed between the screen and the polyurethane foams; the polyurethane foam materials in the reactor; and laminar flow conditions. While laminar flow conditions are not necessary to attain a wastewater treatment, they are necessary to attain the highest quality effluent in the shortest contact time.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
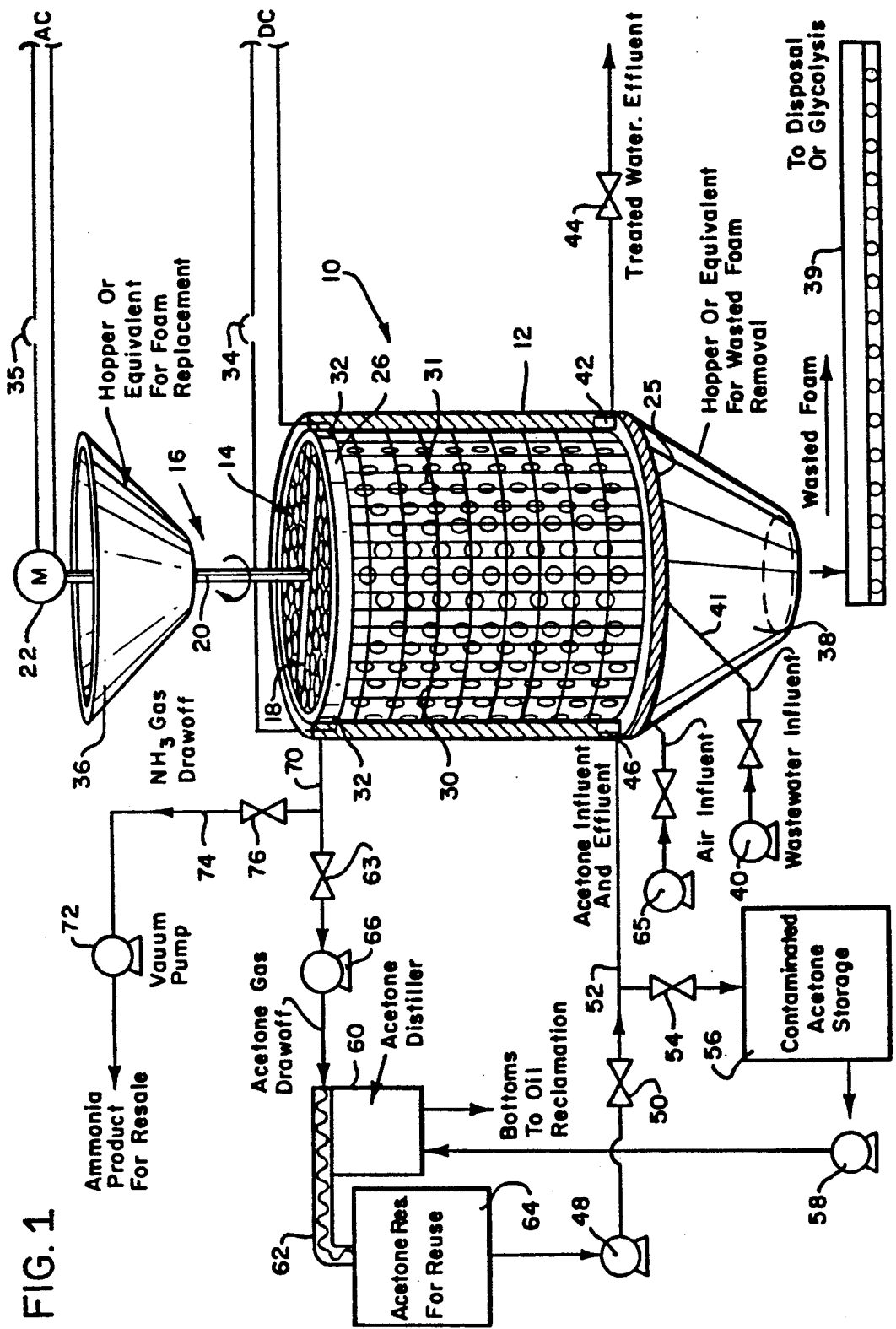
FIG. 1 illustrates diagramatically a process flow diagram and apparatus for carrying out the present invention using the CSBR mode of operation.
Figure 2:
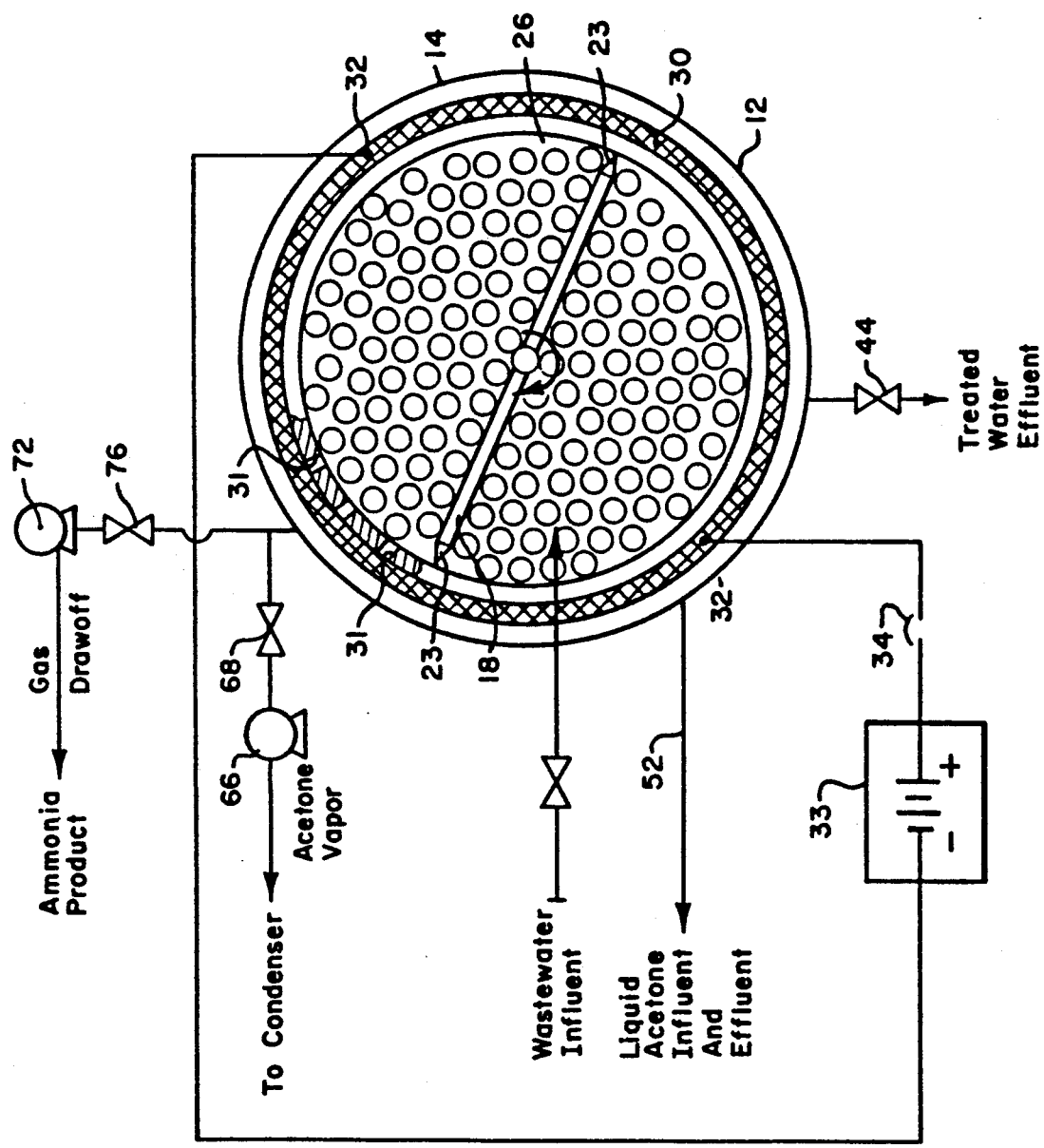
FIG. 2 illustrates diagrammatically a top plan view of a reactor vessel in FIG. 1, and a portion of the apparatus set forth in FIG. 1.

FIGS. 1 and 2 illustrate the CSBR mode of operation. This mode of operation is described in detail. The Japanese manufacturers of the ionized polyurethane foam, which is the optimum foam used in the invention herein, currently use this foam in a tower as previously described above as part of the background of the invention. However, they have not used this foam in the presence of an electrical current. Since a tower is already a mode of operation for this specific type of foam, it would also be an acceptable mode of operation for this invention. Similarly, since open-celled polyurethane foams are currently used as both air and water filters, then an electrolized filter reactor will also be an acceptable mode of operation for this invention. Both towers and filters may need to be operated either in series or as recirculating towers or filters in order to achieve the necessary contact time of the wastewater with the foam, as used with the CSBR, in order to achieve a high quality effluent.

As noted above, the present invention involves removal of pollutants from concentrated petroleum and synthetic-fuels wastewater, such as oil shale retort water and the like, by contacting the wastewater with polyurethane foam shapes and stirring the solution of polyurethane foam shapes and wastewater in the presence of an electrical current to enhance the cationic properties of the foam and aid in further removing pollutants from the wastewater by adsorption. According to a preferred embodiment of the present invention, the stirring action is carried out by a paddle rotateably mounted within a container forming the reactor vessel.

The removal efficiencies of this system can be more than doubled by applying an electrical current to the foam shapes disposed in the reactor vessel.

Although the electric current can be applied to the foam shapes by direct electrical contact with the solution, a preferred embodiment of the present invention proposes to provide an electrical distribution system for this purpose. This system includes a wire, metallic net, or screen disposed within the reactor vessel to encircle an inner perforated casing and connected to a source of electricity. This arrangement more uniformly distributes ionizing current through the solution and avoids electrode corrosion, since the electrodes are kept dry and only the wire mesh is in contact with the solution. The wire mesh is disposed between the inner perforated casing of the reactor vessel and an outer casing or container so as to permit direct contact of portions of the wire mesh with the solution, while preventing damage to the foam shapes and wire mesh by the stirring action of the paddle on the foams and wastewater.

The present invention relates to a one-step batch process arrangement, wherein the solution of wastewater and polyurethane foam shapes is detained in the reactor vessel for typically six hours. Increased detention is found to increase the efficiency of the process, as well as to permit greater removal of useful biproducts such as ammonia off gas from the solution during the process.

The polyurethane foam shapes are cleaned periodically to restore them to their original treatment efficiency. Acetone, or any equivalent organic solvent, can be used to elute oil and pollutants from the foam. Once clean, the foam should be air dried at ambient or warm temperatures up to 100° F., to remove acetone residue. The contaminated acetone can be cost-effectively recovered by distilling it using waste heat or solar energy. After the acetone is distilled, the oily bottoms can be recovered.

Referring to FIG. 1 of the drawings, an apparatus 10 for removing pollutants from concentrated synthetic fuel wastewater, and the like, comprises an enclosed reactor vessel 12 arranged for receiving a quantity of wastewater to be treated, together with a desired amount of polyurethane foam shapes 14 capable of removing pollutants from the wastewater by adsorption. The subject foam is the only foam of many polyurethane foams tested, which significantly responded both to mixing and to the addition of an electrical current to the reactor. This foam is a sponge-like ionized, open-celled, oleophilic polyurethane foam manufactured in Japan, and patented in Japan by Fukushima, et al., and Yoshimura, et al., as discussed above in the background of this invention. The patent descriptions of the ionized foam state that it is an ether-based foam containing 0.3–1.5% ionic groups. The foam is prepared from a tetrafunctional polyol (FA 702), an ionic chain extender, such as benzyl-bis (hydroxyethyl) methylammonium chloride, diphenylmethane diisocyanate, and dibutyltin dilaurate. The manufacturer specifies them as having a specific gravity of 0.04–0.05 grams/milliliter, open-celled structure, cationic charge, an ion exchange capacity of 0.3–0.4 milliequivalents/gram, an ion concentration of 0.5–0.6 milliequivalents/gram, and a combustion yield of 6,000–7,000 calories per gram. This foam is available at present only as foam chips. The chips are irregularly shaped and range in thickness, length, and width from about ⅛-inch to 2-inch. Visual inspection of the foams places cell density at about 70 pores per inch, but the foams do not appear to be reticulated so that there is some range in the cell density. While it is possible that other polyurethane foams which possess an ionic charge may be suitable for use with this invention, conventional polyurethane foams did not respond to electrolysis or mixing, and are not recommended for use in this process. The optimum concentration of foam to wastewater is 40 grams of foam per liter of retort or wastewater, although the concentrations may be increased or decreased for industrial scale pollutant removal.

A mixing assembly 16 extends into container 12 for stirring the polyurethane foam 14 and the wastewater to be treated so as to aid removal of pollutants from the wastewater. As illustrated, a stirring paddle 18 is mounted on a suitable shaft 20 for rotation within the reactor vessel 12 by a conventional electric motor 22, such that the stirring paddle 18 (shown in FIG. 2) can be rotated at a sufficient rate to turn the foam at a peripheral velocity of about 1300 to about 2400 inches per minute (55 centimeters to 102 centimeters per second). This represents a centrifugal force of about 0.3 to 0.6 pounds. The mixing paddle 18 is a reinforced, perforated screen design which permits the wastewater to pass through the paddle, but not the polyurethane foams. The mixing paddle extends the height and diameter of the inner casing. This design assists in maintaining laminar flow conditions in the reactor. The paddle tips can be made from a suitable natural or synthetic rubber. The purpose of the rubber tips on the mixing paddle is to prevent the mixing paddle from scraping the inner perforated plastic casing 26. This stirring action enhances the cationic properties of the polyurethane foams 14 and aids in further removing pollutants from the wastewater. During stirring of the solution, ammonia nitrogen ($NH_3$) will be formed as a byproduct of the treatment. Peripheral velocities of the foam above 2400 inches per minute (102 centimeter per second) reduce turbidity and total organic carbon (TOC) removals, although color removal efficiency continues to increase. It is believed that velocities above this level, increase pressure on the foam due to angular forces, and introduce turbulent flow conditions, causing the release of suspended matter from the foam. Also, these higher velocities cause physical disintegration of the foam. What is required is nonturbulent flow (laminar flow) conditions.

Figure 3:
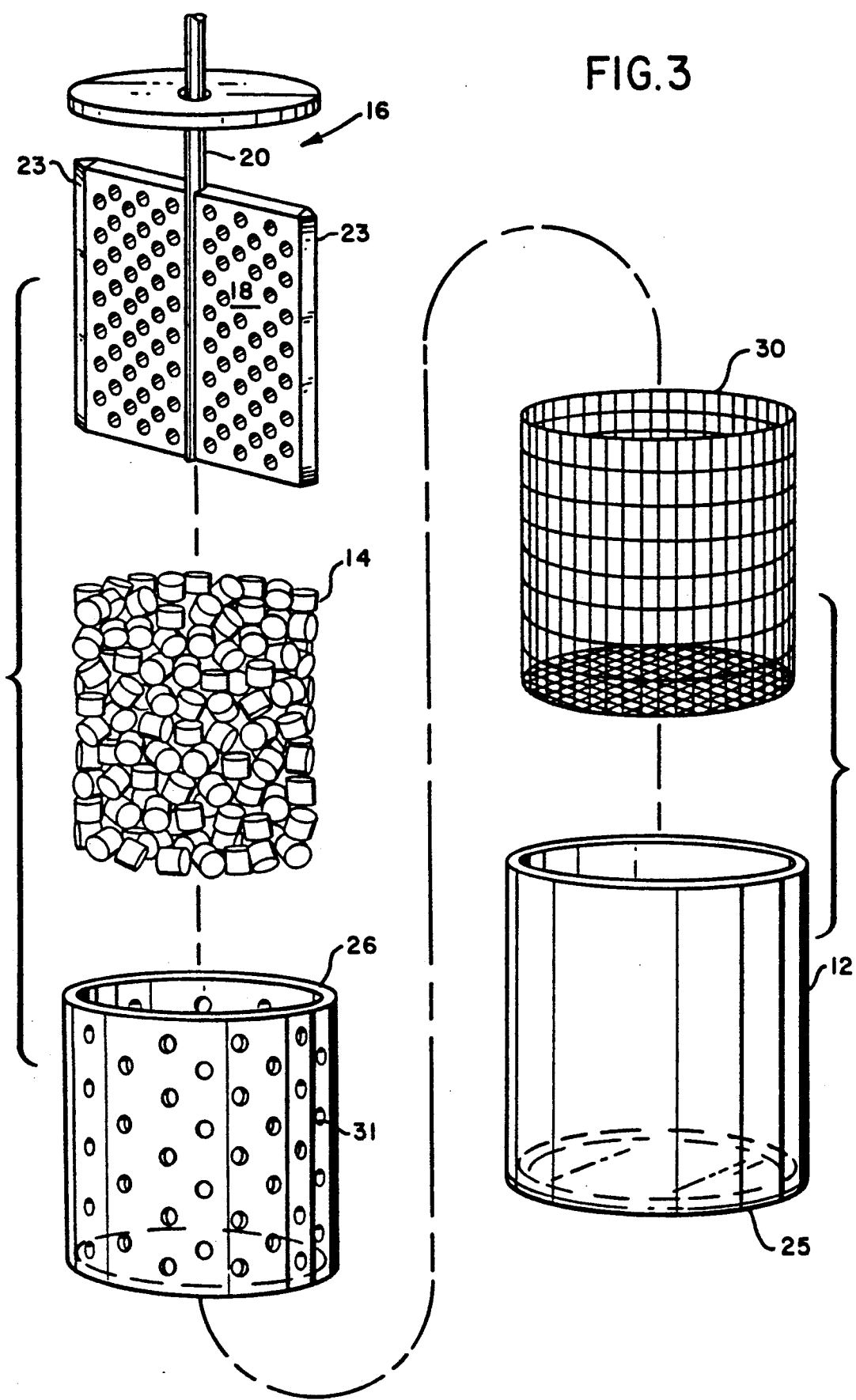
FIG. 3 is an exploded view of the reactor vessel.
Figure 3B:
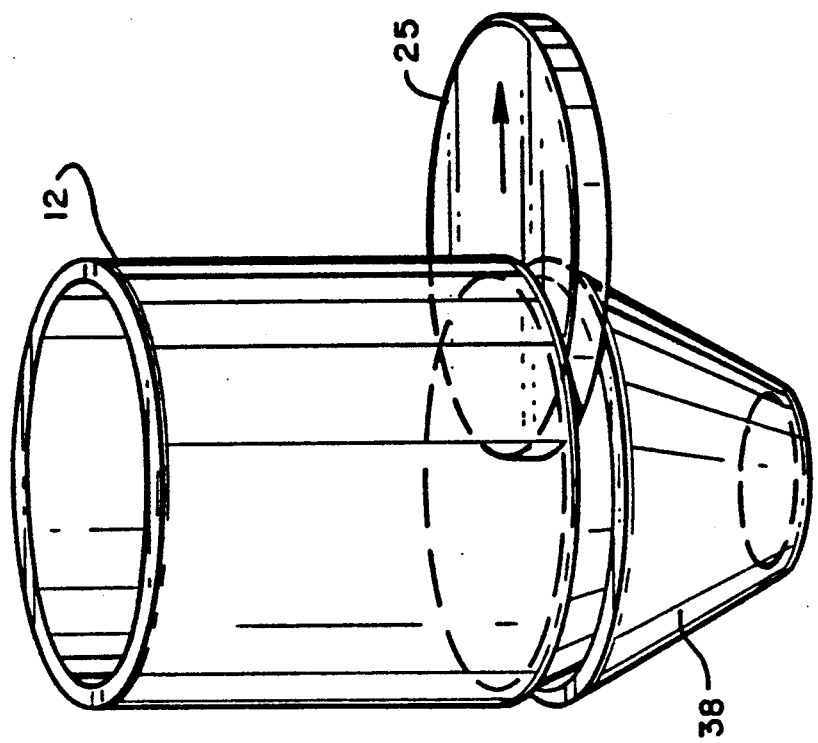
FIGS. 3a and 3b, illustrate the use of hoppers for replacement of foam and for removal of wasted foam.
Figure 3A:
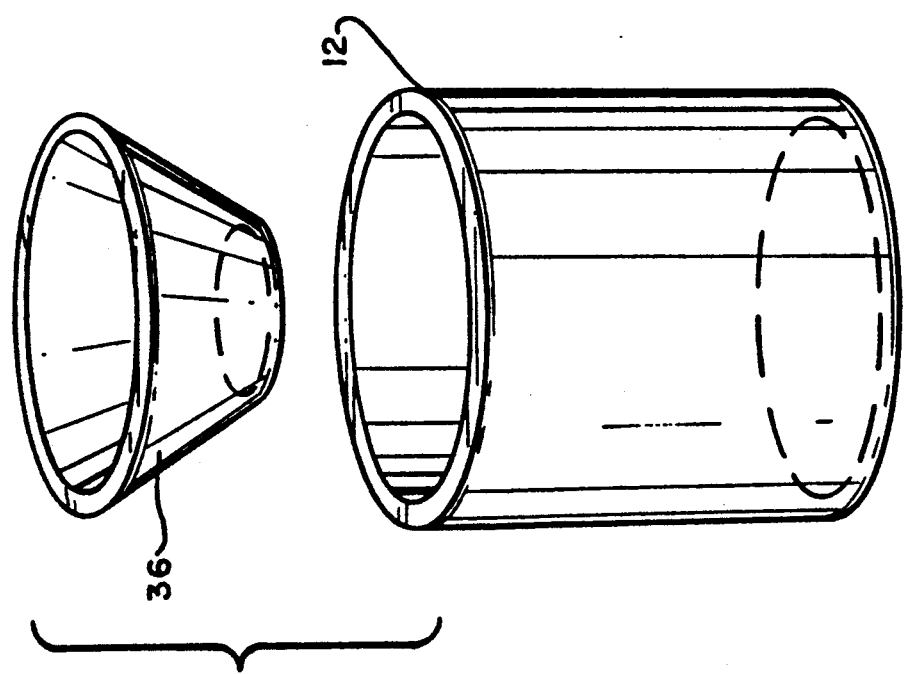

A mechanism for drawing off ammonia gas ($NH_3$), formed during the process, will now be described. The CSBR reactor vessel 12 is of generally cylindrical configuration, as shown cut away in front in FIG. 1. It includes a flat bottom 25, and a perforated inner protective casing 26 spaced from the outer reactor vessel 12, as shown in FIG. 2, to form a generally cylindrical cavity within the vessel 12. A suitable cover shown schematically in FIG. 3 may be used to enclose the polyurethane foam in the reactor vessel in a tight manner (although a suitable opening must be provided for the shaft 20 to pass into the container). Arranged between the vessel 12 and the inner casing 26 is an electrical distribution system for applying an electrical current through the wastewater to the polyurethane foam 14 comprising an electrically conductive screen 30, such as a 17 mesh to 30 mesh aluminum screen, encircling the inner casing 26, within the outer vessel 12. The assembly of the reactor vessel, screen or mesh, inner vessel and stirring paddle is illustrated schematically in FIG. 3. There the polyurethane foam shapes are shown as neatly stacked chips, where as in practice the chips are irregularly shaped, and vary in thickness, length and width, as noted herein before. FIG. 3a illustrates the use of the hopper 36 to load the polyurethane foam chips or shapes and FIG. 3b illustrates the use of the hopper 38 to remove wasted foam chips or shapes.

The screen is connected to a pair of electrodes 32 positioned at the top of the vessel 12 above the solution. The electrodes are connected to a suitable power source, such as a battery 33 shown in FIG. 2. Conventional alternating current electricity might also be acceptable.

The perforated inner protective casing 26 allows the solution to come into contact with the screen 30 while the electrodes 32 distribute current through the screen 30. The use of a conducting aluminum screen 30 appears to be a more practical and safer way to introduce a flow of current. This is because use of the screen keeps the electrodes dry and thus prevents them from corroding. This arrangement also prevents deposition of metal on the electrodes and prevents metal from being solubilized into the solution.

The effective range of current applied to the screen 30 ranged from 1 mamp to 1,000 mamps on a laboratory scale. This represents a current density range of $2.5 \times 10^{-3}$ mamps/cm$^2$ to 2.5 mamps/cm$^2$. The optimum electrical current on an industrial scale will be higher, but current densities will remain approximately the same.

A circuit breaker 34 can be inserted in one of the lines leading from the electrodes 32 to the power source for safety. A circuit breaker 35 (shown in FIG. 1) protects the motor 22.

There are four main mechanisms of action which enable the invention to remove pollutants from oil-based wastewaters.

Absorption

A certain amount of absorption will occur with most open-celled polyurethane foams regardless of mixing or laminar flow pumping, but this is not adequate for good treatment of concentrated wastewaters containing many dissolved pollutants. Absorption is dependent on foam cell density (pores per inch), synthetic base either ether or ester base, surface area, and other foam characteristics.

Ionic Attraction

The Japanese foam is manufactured with a positive charge (cationic), and possesses an ion exchange capacity. The oil shale retort water, and most petroleum wastewaters, have an electronegative charge and consequently pollutants in the wastewaters are attracted more strongly to this foam than to conventional polyurethane foams. This ionic attraction is enhanced by mixing and by laminar flow pumping, and by electrolysis.

Electrolysis/Ionized Foam Interaction

With the addition of an electrical current to the reactor, wastewater treatment is greatly enhanced. Pollutant removals which could not occur, regardless of contact time or laminar flow conditions, now occur. The mechanism of interaction between the ionized, Japanese foam and the electrical current is not known. It is hypothesized here that the electricity may be interacting with the dibutyltin in the ionized foam. The electrical current contacts the wastewater and the wastewater is in integral contact with the foam, such that the dibutyltin in th foam may increase the conductivity throughout the wastewater electrolyte thereby enhancing electro-organic oxidation and other electrolysis interactions. Other ionized polyurethane foams could also react similarly, but have not yet been tested. Conventional open-celled polyurethane foams currently available in the U.S. were tested and did not respond to the addition of an electrical current; and are not recommended for use in this process.

Electrolysis

At least two mechanisms of action occur during electrolysis of wastewater regardless of whether the ionized polyurethane foam is present or not. These actions are electro-organic oxidation and electroplating. Electrolysis of wastewater has been tested since the late 1800s with sewage and more recently with oil shale retort water and other wastewaters. The solutions have a high resistance to the electrical current, making electrolysis difficult and not economically feasible for large scale wastewater treatment. Something is needed to reduce this resistance to make electrolysis cost effective on a large scale. The ionized foams do this. Electro-organic oxidation is the mechanism whereby electricity added to water produces oxygen, ozone, and radicals from the water molecule and organic matter present in the wastewater. These strong oxidizers degrade organic and organonitrogen compounds to carbon dioxide, ammonia, and water. This reaction is strongly catalyzed in the presence of the ionized foams. Electroplating also occurs when electricity is added to a solution containing metals. While the bulk of the electrical current is conducted through the aluminum reactor screen, adequate electricity travels through the solution to cause metal ion interaction with the electrical current. It is believed that the ionized foams also enhance this reaction, although this needs to be investigated further.

A hopper 36, or other arrangement, can be provided above the reactor vessel 12 for loading the polyurethane foam 14. A hopper 38 is arranged at the bottom of the container 12 for removal of the poyurethane foams 14 when they are no longer reclaimable in situ. A conveyer 39 of conventional construction may be employed to remove the wasted foam passing through the hopper 38 beneath the reactor vessel. The use of trucks in place of a conveyer belt is also acceptable to remove the spent foam directly from the reactor.

Wastewater to be treated can be fed into the reactor vessel 12 as by a conventional pump 40 and associated valve connected to the interior of container 12 in a suitable manner. Once pollutants are sufficiently removed from the wastewater by the electrolysis foam process, the treated water is removed from the vessel 12 through a filter 42 and associated valve 44 disposed at the bottom of the reactor vessel.

Having removed the treated water, acetone or the like is introduced into the enclosed vessel 12 for cleaning the polyurethane foam 14. The material is agitated during the cleaning process by the stirring paddle 18. A 1:1 ratio (or greater) of acetone to foam by volume, and a detention time of 15 minutes, will return the foam to near their original treatment efficiency. A filter 46 is provided in a bottom portion of the vessel 12, and acetone influent is introduced into the container through the filter 46 by a valve 50 and a connecting line 52. Withdrawal of the contaminated acetone is by gravity through line 52 and a valve 54 communicating with a storage tank 56. Contaminated acetone held in the storage tank is periodically fed by a pump 58 into an acetone distiller 60 which can use waste heat, and/or solar energy, or conventional heat. The contaminated acetone can be cost-effectively recovered by distilling with waste heat or solar energy because the boiling point of acetone is low at 133° F. as compared to water, which is 212° F. Finally, the treated acetone vapor is condensed in the condenser 62 and piped into a storage tank 64.

The polyurethane foams 14, treated with acetone, are air dried with ambient or warm air to remove acetone residue. The procedure is accomplished by a pump 65 which feeds ambient or warm air into the vessel 12. Acetone gas formed from the air drying process is removed from the enclosed vessel 12 as by a vacuum pump 66 through a valve 63 arranged in a line 70 to the acetone distiller 60.

The ammonia created by the wastewater treatment process also can be removed from the vessel 12 by a line 70 using a vacuum pump 72 in a line 74 guarded by a valve 76. The ammonia product thus recovered can be sold in order to further enhance the cost-effectiveness of the system according to the present invention.

Wastewater successfully treated by the present invention included Occidental-6 oil shale retort water obtained from the U.S. Department of Energy, Laramie Energy Technology Center in Laramie, Wyo. Chemical pollutant concentrations for this wastewater were analyzed according to the publication *Standard Methods for the Examination of Water and Wastewater*, American Public Health Association, American Water Works Association, Water Pollution Control Federation, 15th Ed., APHA, Washington, D.C., 1980. The Occidental-6 retort water is a highly concentrated, toxic wastewater that is a factor of 10 to 100 times, depending on the pollutant measured, more concentrated than the average domestic sewage. Retort water contains almost all of the 129 EPA priority pollutants, except pesticides, and this greatly contributes to its toxicity. This wastewater has many pollutant parameters in common with conventional oil refinery wastewaters, including high concentrations of emulsified and floating surface oil, high chemical oxygen demand (COD), high ammonia and organic nitrogen concentrations, color and suspended solids, as well as biological toxicity and low biodegradability.

Using the invention described herein, the chemical oxygen demand (COD) was reduced by more than 90% from influent COD concentrations as high as 36,000 mg/l within a detention time of 6 hours. Within a contact time of 2 hours, turbidity reductions were greater than 90%, and achieved as high as 99% removal within the 6 hour detention time. Oil and grease reduction ranged from 80-91% including both soluble and floating oil, and varied with design criteria. With wastewater influent suspended solids (SS) concentrations as high as 2010 mg/l, the SS removals averaged 97.8% in 6 hours or less. Ammonia nitrogen removals averaged 56.2% within 6 hours. Increased detention times and increased electrical current values increased removals of most of the pollutants analyzed.

Although particular embodiments of the invention have been described and illustrated herein, it is recognized that modifications and variations may readily occur to those skilled in the art. For example, three different modes operation of the invention for wastewater treatment previously described above in the summary of the invention.

What is claimed is:

1. Appartus for removing pollutants from a liquid, said apparatus comprising, in combination:
   a vessel for receiving said liquid to be treated;
   shapes of ionized polyurethane foam disposed within said vessel for removing pollutants from said liquid to be treated;
   means for applying a low level electrical current through said shapes and said liquid in said vessel which creates an electrolysis reaction with said liquid that enhances pollutant removal; and
   means for producing relative motion of said liquid over said ionized polyurethane foam shapes for aiding removal of pollutants from said liquid.

2. Apparatus as defined in claim 1 wherein said means for producing said relative motion includes a stirring paddle rotatably mounted within said vessel.

3. Apparatus as defined in claim 1 wherein said means for producing said relative motion is comprised of a stirring paddle arranged for rotation of said ionized polyurethane shapes within said vessel at peripheral velocities in a range of about 55 centimeters to 102 centimeters per second.

4. Apparatus as defined in claim 1 wherein said means for applying an electrical current includes an electrically conductive screen disposed within the said vessel and a low level current source connected to said screen for producing electrical current through said liquid and ionized polyurethane foam shapes disposed within said vessel.

5. Apparatus as defined in claim 4 wherein said vessel includes a perforated inner casing forming a cavity within said vessel for containing said polyurethane foam shapes, said conductive screen is disposed between said perforated inner casing and said vessel, and said current source is connected to said screen at one point to inject current and to a diametrically opposite point to return current to said source.

6. Apparatus as defined in claim 4 wherein said means for applying an electrical current to said liquid provides a current density in said solution in the range of $2.5 \times 10^{-3}$ mamps/cm$^2$ to 2.5 mamps/cm$^2$.

7. Apparatus as defined in claim 1 wherein said ionized polyurethane foam is comprised of ionized open-celled polyurethane foam.

* * * * *